(12) United States Patent
Czachor et al.

(10) Patent No.: US 6,364,603 B1
(45) Date of Patent: Apr. 2, 2002

(54) FAN CASE FOR TURBOFAN ENGINE HAVING A FAN DECOUPLER

(76) Inventors: Robert P. Czachor, 19 Ritchie Ave., Cincinnati, OH (US) 45215; Robert J. Hemmelgarn, 6046 Hummingbird Dr., Mason, OH (US) 45040

( * ) Notice: Subject to any disclaimer, the term of this patent is extended or adjusted under 35 U.S.C. 154(b) by 0 days.

(21) Appl. No.: 09/431,463

(22) Filed: Nov. 1, 1999

(51) Int. Cl.⁷ .............................................. F01D 21/00
(52) U.S. Cl. .......................................... 415/9; 415/200
(58) Field of Search ...................... 415/9, 200, 173.4, 415/174.4, 197, 119; 277/415, 419

(56) References Cited

U.S. PATENT DOCUMENTS

| | | | |
|---|---|---|---|
| 4,149,824 A | 4/1979 | Adamson | 415/9 |
| 4,193,741 A | 3/1980 | Briggs | 416/170 |
| 5,160,248 A | 11/1992 | Clarke | 415/9 |
| 5,408,826 A * | 4/1995 | Stewart et al. | 415/9 |
| 5,486,086 A * | 1/1996 | Bellia et al. | 415/9 |
| 5,513,949 A | 5/1996 | Armstrong | 415/9 |
| 5,823,739 A * | 10/1998 | Van Duyn | 415/9 |
| 5,885,056 A | 3/1999 | Goodwin | 415/9 |
| 6,113,347 A * | 9/2000 | Forrester | 415/9 |
| 6,149,380 A * | 11/2000 | Kuzniar et al. | 415/9 |
| 6,206,631 B1 * | 3/2001 | Schilling | 415/9 |

FOREIGN PATENT DOCUMENTS

| | | |
|---|---|---|
| EP | 0816640 | 1/1998 |
| GB | 2246818 | 2/1992 |

* cited by examiner

Primary Examiner—Christopher Verdier
Assistant Examiner—Richard Woo
(74) Attorney, Agent, or Firm—Andrew C. Hess; Nathan D. Herkamp

(57) ABSTRACT

A fan case for a turbofan engine having a fan including plurality of fan blades mounted to a rotor disk and a decoupler that fails in response to a predetermined load includes a substantially annular shell. The shell has a forward section, an intermediate section, and an aft section. The fan case further includes an aft facing step formed at the forward end of the intermediate section to prevent blade fragments from being ejected forward. The intermediate section is axially aligned with the fan and has a large inside diameter. The intermediate section thus defines an annular space around the fan blades that is sufficiently large to allow the fan to orbit when the decoupler fails. The intermediate section and the aft section are aligned radially to allow blade fragments to be ejected aft, avoiding additional secondary blade damage.

18 Claims, 2 Drawing Sheets

FAN CASE FOR TURBOFAN ENGINE HAVING A FAN DECOUPLER

BACKGROUND OF THE INVENTION

This invention relates generally to turbofan gas turbine engines and more particularly to fan cases for such engines.

A turbofan gas turbine engine used for powering an aircraft in flight typically includes, in serial flow communication, a fan, a low pressure compressor or booster, a high pressure compressor, a combustor, a high pressure turbine, and a low pressure turbine. The combustor generates combustion gases that are channeled in succession to the high pressure turbine where they are expanded to drive the high pressure turbine, and then to the low pressure turbine where they are further expanded to drive the low pressure turbine. The high pressure turbine is drivingly connected to the high pressure compressor via a first rotor shaft, and the low pressure turbine is drivingly connected to both the fan and the booster via a second rotor shaft.

The fan includes a plurality of circumferentially spaced apart fan blades extending radially outwardly from a rotor disk that is drivingly connected to the low pressure shaft. Each fan blade generally has an airfoil section and an integral dovetail root section that attaches the blade to the rotor disk. The fan is rotatively supported on a nonrotatable frame, commonly referred to as the fan frame, by a support system that typically includes a number of bearings and bearing support structure.

During engine operation, there is a remote possibility that a foreign body, such as a bird, could impact the fan and cause a fan blade-out event; i.e., part or all of a fan blade becomes detached from the rotor disk. Such a detached fan blade could cause considerable damage to the aircraft powered by the engine if it were not contained by the fan case. Various containment systems have been developed to prevent such damage. Fan blade containment systems have traditionally included an annular containment case manufactured from a high strength material with an adequate shell thickness to absorb the kinetic energy of an impacting fan blade. More recent containment systems have employed nesting areas defined by inner and outer annular shells having honeycomb structures disposed therein. In addition, ballistic material, such as an aromatic polyamide fiber, may be wrapped around the case structure. Blade fragments are captured in the nesting area and are thus contained within the system and prevented from further contact with other fan blades.

A fan blade-out event creates a large imbalance in the fan rotor, which could result in the transmission of potentially damaging imbalance forces to the fan frame. This is particularly the case with the increased fan size of recent commercial engine models, because the imbalance loads to be sustained during a fan blade-out event are increasingly large. One solution is to incorporate a decoupler in the fan rotor support structure. A decoupler is a frangible structure designed to fail in response to a fan blade-out load and allow the fan rotor to orbit about its new center of mass. Thus, the large imbalance loads are not transmitted to the fan frame. Accordingly, use of a decoupler effectively reduces the overall weight of the engine because the fan frame and related structure need not be made sufficiently strong to withstand substantial imbalance forces.

A fan case for a turbofan engine having a decoupler has two unique requirements. First, it must maintain a tight running clearance with the fan blade tips during normal engine operation while allowing the fan rotor to orbit after a fan blade-out event causes the decoupler to fail. A second requirement is to control the trajectory of secondary blade fragments. During a fan blade-out event, the released blade, and typically a portion of the first trailing blade broken off by the released blade, will break up upon impacting the fan case. It is desirable that these fragments exit the axial plane defined by the fan rotor so as to avoid additional secondary blade damage. Additional blade damage will increase the imbalance and aggravate the containment problem. Furthermore, it is desirable that the blade fragments exit the fan plane in the aft direction. This way, the fragments will impact the fan outlet guide vanes downstream of the fan. This secondary impact will either be sufficient to absorb the remaining fragment energy, or will fracture the outlet guide vanes and allow the fragments to escape through the fan flowpath aft of the engine, in the normal direction of the engine exhaust. Either outcome is acceptable in response to a fan blade-out event. However, if a blade fragment is deflected forward of the fan plane, the aircraft can be at hazard, especially if the fragment completely escapes the engine inlet.

Accordingly, there is a need for a fan case that allows the fan rotor to orbit during a fan blade-out event and causes blade fragments to exit the fan plane in the aft direction.

SUMMARY OF THE INVENTION

The above-mentioned need is met by the present invention which provides a fan case for a turbofan engine having a fan including plurality of fan blades mounted to a rotor disk and a decoupler that fails in response to a predetermined load. The fan case includes a substantially annular shell having a forward section, an intermediate section, and an aft section. The intermediate section being axially aligned with the fan and having a forward end. The fan case further includes an aft facing step formed at the forward end of the intermediate section.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
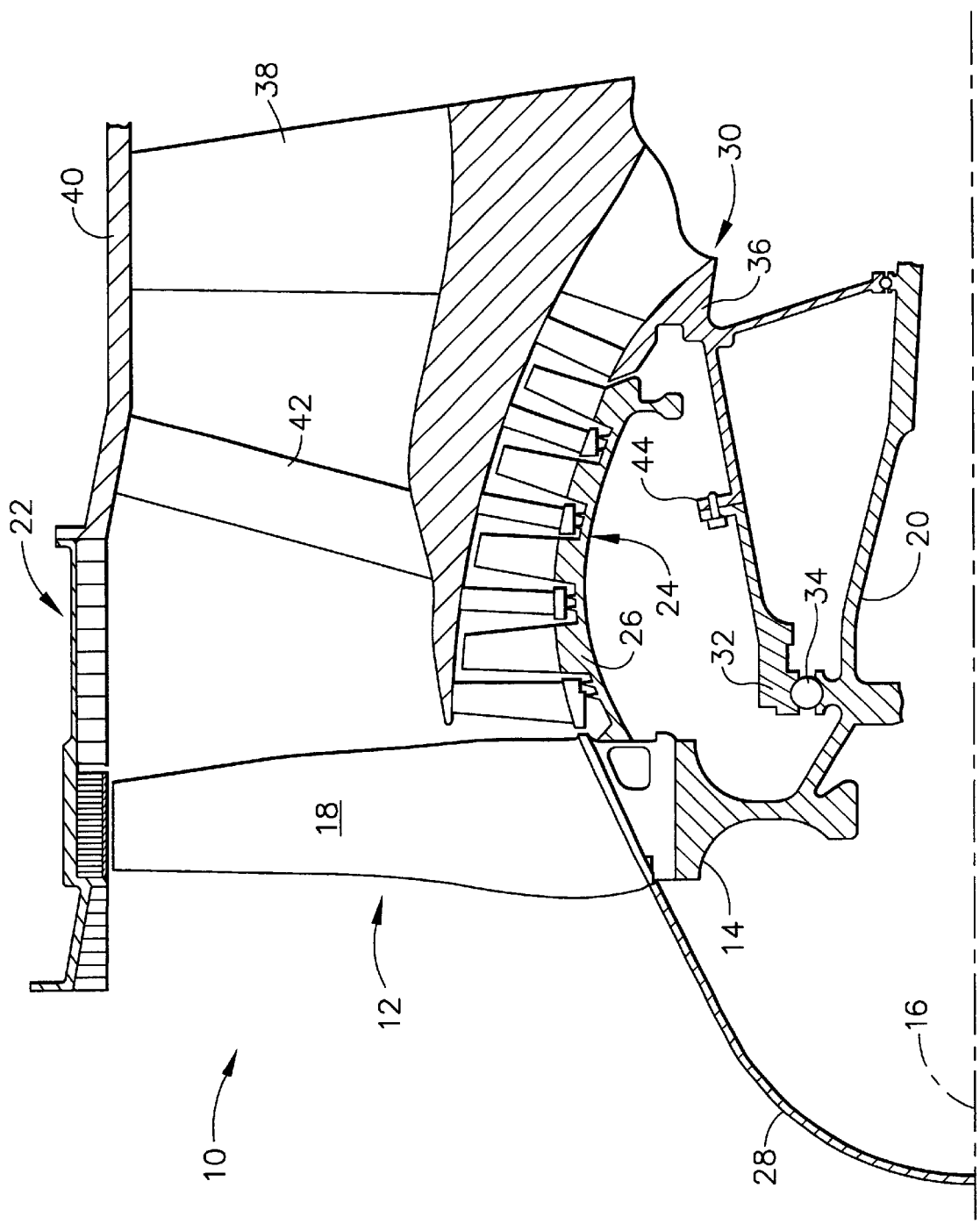
FIG. 1 is a longitudinal cross-sectional view of the forward portion of a high bypass ratio turbofan engine incorporating the fan case of the present invention.

Referring to the drawings wherein identical reference numerals denote the same elements throughout the various views, FIG. 1 illustrates a longitudinal cross-sectional view of a high bypass ratio turbofan engine 10. The engine 10 includes a fan 12 comprising an annular rotor disk 14 rotatable about a longitudinal centerline axis 16 and a plurality of circumferentially spaced apart fan blades 18 (only one shown in FIG. 1) that extend radially outwardly from the disk 14. The rotor disk 14 is drivingly connected to a fan shaft 20 that is powered by a conventional low pressure turbine (not shown). An annular fan case 22 is positioned radially outward of the fan blades 18 and in surrounding relationship therewith.

Disposed downstream of the fan 12 is a booster 24 having axially spaced apart vane and blade rows, with the blades thereof being joined to a booster spool or shaft 26. The booster shaft 26 is suitably fixedly joined to the aft side of the rotor disk 14 in a conventional manner. A conical spinner 28 is joined to the forward side of rotor disk 14 to provide an aerodynamic flow path for air entering the fan 12. Other conventional structures of the engine 10, such as a high pressure compressor, combustor, high pressure turbine, and low pressure turbine are not shown for clarity of illustration.

The fan 12 is rotatively supported on a stationary fan frame 30 by a bearing support 32 and a bearing 34 that is disposed between the fan shaft 20 and the bearing support 32. The fan frame 30 includes an inner hub 36 and a plurality of circumferentially spaced apart support struts 38 extending therebetween the inner hub 36 and an annular outer duct 40. The outer duct 40 is joined to the aft edge of the fan case 22. Fan outlet guide vanes 42 extend radially across the outer duct 40 for the purpose of removing swirl from the airflow through the outer duct 40. The bearing support 32 is secured to the inner hub 36 via a decoupler 44. The decoupler 44 is a conventional frangible structure designed to fail in response to a predetermined load.

During normal operation of the engine 10, ambient air is drawn into the engine inlet and passes through the fan 12. A first portion of the air is directed into the booster 24. This air is pressurized by the booster 24 and the high pressure compressor. The pressurized air then enters the engine's combustor where it is mixed with fuel and burned to provide a high energy stream of hot combustion gases. The high energy gas stream first passes through the high pressure turbine where it is expanded, with energy extracted to drive the high pressure compressor. The gas stream then passes through the low pressure turbine where it is further expanded, with energy being extracted to drive the fan 12 and the booster 24. A second portion of the ambient air, referred to as the bypass airflow, passes through the fan 12 and the fan outlet guide vanes 42 before exiting the engine through the outer duct 40. The bypass airflow provides a significant portion of the engine thrust.

However, in the event that a fan blade-out causes a large imbalance in the fan 12, the decoupler 44 will fail. This will allow the fan 12 to orbit about its new center of mass and prevents large imbalance loads from being transmitted to the fan frame 30.

Figure 2:
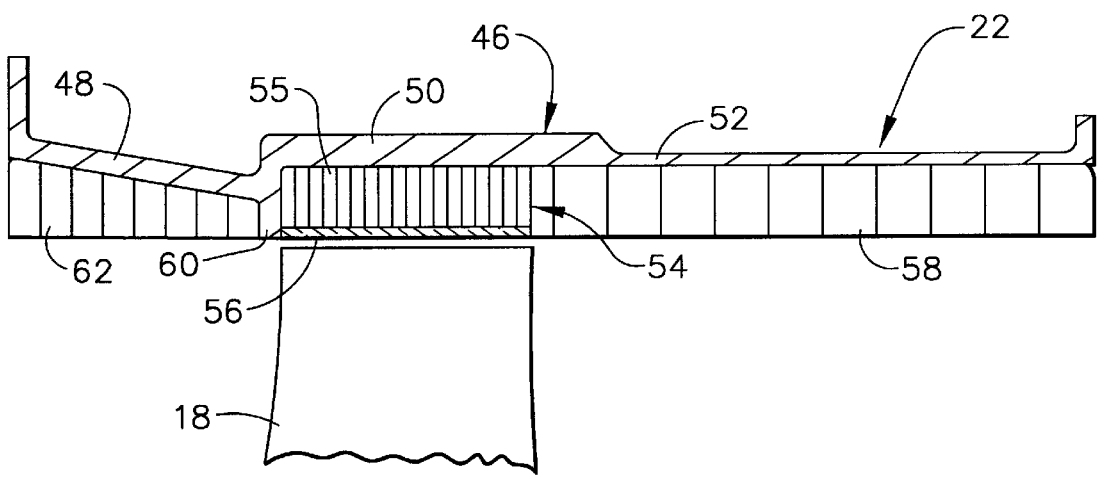
FIG. 2 is a cross-sectional view of the fan case of FIG. 1.

Referring to FIG. 2, the fan case 22 of the present invention is shown in more detail. The fan case 22 maintains a tight running clearance with the fan blade tips during normal engine operation and allows the fan 12 to orbit after a fan blade-out event causes the decoupler 44 to fail. Specifically, the fan case 22 comprises a substantially annular shell 46 that encircles the fan 12 and is preferably made of a metallic material. The shell 46 has a forward section 48, an intermediate section 50, and an aft section 52. These three sections are preferably integrally formed with the intermediate section 50 being located between the forward section 48 and the aft section 52. The intermediate section 50 is axially aligned with the fan 12 and has a large inside diameter that is substantially greater than the tip diameter defined by the fan blades 18.

Accordingly, the intermediate section 50 defines a deep annular space, referred to hereinafter as the rotor orbit space, surrounding the fan blades 18. As will be described in more detail below, the rotor orbit space is sufficiently large to allow the fan 12 to orbit if the decoupler 44 fails. The rotor orbit space is filled with a lightweight, frangible filler material 54 that defines the fan flowpath boundary and maintains a tight blade tip clearance during normal engine operation. The filler material 54 may comprise a layer of honeycombed material 55 (such as aluminum or aluminum alloy) covered with a layer of conventional abradeable material 56. The intermediate section 50 preferably has a greater wall thickness than the other sections of the fan case 22 so as to provide this section of the fan case 22 with sufficient strength to contain blade fragments.

The aft section 52 of the fan case 22 has the same enlarged inside diameter of the intermediate section 50 so as to define a continuous inner surface. The flowpath boundary is maintained by a conventional acoustic panel 58, or some other lightweight, frangible structure, that is attached to the aft section 52.

An aft facing step 60 is formed in the fan case 22 at the juncture of the forward section 48 and the intermediate section 50, or, in other words, at the forward end of the intermediate section 50. The aft facing step 60 is thus located immediately forward of the plane defined by the fan 12.

The aft facing step 60 is in the form of an annular flange having a radially inner edge that defines a cylindrical surface. This cylindrical surface is substantially coextensive with the flowpath boundary as defined by the filler material 54 and thus defines an inside diameter that is significantly less than the inside diameter of the intermediate section 50.

The forward section 48 extends forward from the aft facing step 60. The forward section 48 has a lesser inside diameter than the intermediate section 50, although it is still larger than the diameter defined by the flowpath boundary. The flowpath boundary is maintained by another conventional acoustic panel 62, or some other lightweight, frangible structure, that is attached to the forward section 48.

During normal engine operation, the fan case 22, together with the filler material 54, will maintain a tight running clearance with the fan blade tips. More particularly, the inner edge of the aft facing step 60, the filler material 54 and the two acoustic panels 58 and 62 define a continuous, substantially uniform flowpath boundary diameter. However, during a fan blade-out event, both the frangible structure in the fan plane (i.e., the filler material 54) and the frangible structure aft of the fan plane (i.e., the acoustic panel 58) will be destroyed by the blade fragments. The aft facing step 60 will prevent blade fragments from being ejected forward of the fan plane, while the continuous enlarged diameter of the intermediate and aft sections 50 and 52 will allow the blade fragments to escape aft, in the direction desired to prevent additional secondary blade damage. Furthermore, if the fan bladeout event causes the decoupler 44 to fail, the filler material 54 will be easily ground away by the fan blades 18 remaining on the still rotating rotor disk 14. The now open rotor orbit space will provide sufficient room for the fan 12 to orbit about its new center of mass.

To permit the fan 12 to orbit after the decoupler 44 fails, the depth of the rotor orbit space, as dictated by the inside diameter of the intermediate section 50, must be sized appropriately. Specifically, the inside diameter of the intermediate section 50 must be large enough that the fan blades will not contact the annular shell 46 during fan rotor orbiting. On the other hand, in order to reduce the overall weight of the fan case 22, it is desirable that the intermediate section inside diameter be no larger than necessary to permit fan rotor orbiting. To achieve a suitable balance, the intermediate section inside diameter is preferably, but not necessarily, designed to accommodate the level of imbalance expected from a typical fan blade-out event. Generally, a typical fan blade-out event is considered to be a loss of 1.5 blades. Thus, the intermediate section inside diameter needed to accommodate a typical fan blade-out event can be determined by calculating the center of gravity of the fan 12 if 1.5 blades were lost.

Figure 3:
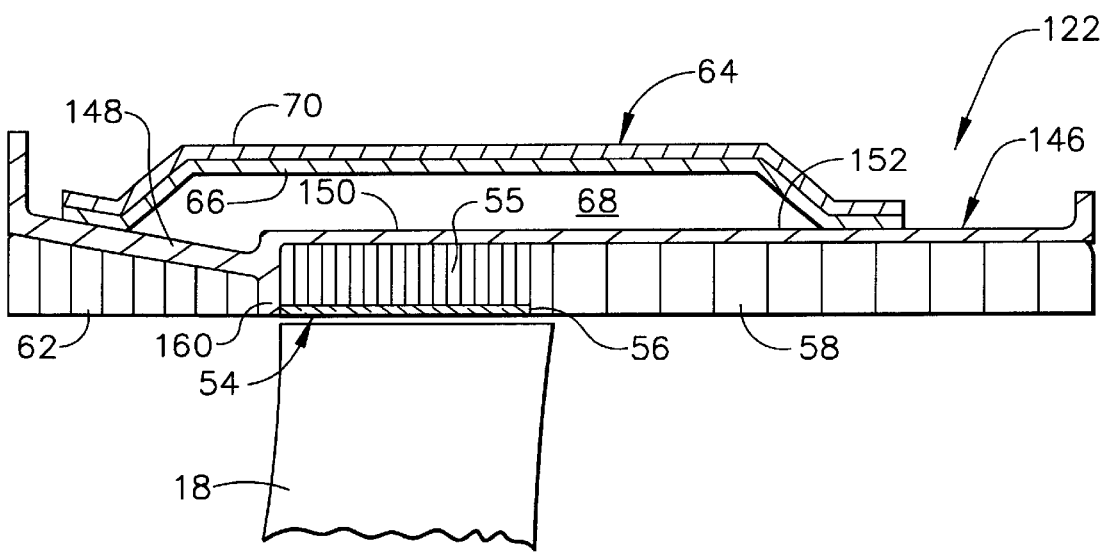
FIG. 3 is a cross-sectional view of an alternative embodiment of a fan case of the present invention.

Turning to FIG. 3, an alternative embodiment of the present invention is illustrated. In this embodiment, a fan case 122 comprises a substantially annular shell 146 that is preferably made of a metallic material. As in the first embodiment, the shell 146 has a forward section 148, an intermediate section 150, and an aft section 152. The intermediate section 150 is axially aligned with the fan 12 and has an enlarged inside diameter so as to define a deep rotor orbit space. The rotor orbit space is filled with a lightweight, frangible filler material 54. The filler material 54 may be a layer of a honeycombed material 55 covered with a layer of conventional abradeable material 56. Conventional acoustic panels 58 and 62 are attached to the inner surfaces of the aft and forward sections 152 and 148, respectively to maintain the fan flowpath boundary. An aft facing step 160 is formed in the fan case 122 at the forward end of the intermediate section 150.

The fan case 122 differs from the first embodiment in that the intermediate section 150 is not thicker than the other sections of the fan case 122. Instead, the fan case 122 includes a blade containment system 64 is disposed around the annular shell 146, most particularly the intermediate section 150. The blade containment system 64 comprises an outer shell 66 that is spaced radially outward of the annular shell 146 and is attached to the annular shell 146 at upstream and downstream locations so as to define a chamber 68 therebetween. The chamber 68, which is also known as a nesting area, preferably includes a honeycomb structure (not shown) which is used to retain broken blades or blade fragments therein. A ballistic material 70, such as an aromatic polyamide fiber, is wrapped around the outer surface of the outer shell 66 to contain the blade fragments.

The alternative embodiment functions in a manner very similar to the first embodiment in that, during normal engine operation, the fan case 122, including the filler material 54, will maintain a tight running clearance with the fan blade tips. However, during a fan blade-out event, both the frangible structure in the fan plane (i.e., the filler material 54) and the frangible structure aft of the fan plane (i.e.., the acoustic panel 58) will be destroyed by the blade fragments. If the blade fragments have sufficiently kinetic energy, they will pierce the annular shell 146 and be captured in the chamber 68. Any fragments not piercing the annular shell 146 will escape aft of the fan plane due to the continuous enlarged diameter of the intermediate and aft sections 150 and 152. In any case, the aft facing step 160 will prevent blade fragments from being ejected forward of the fan plane. In addition, if the fan blade-out event causes the decoupler 44 to fail, the filler material 54 will be easily ground away by the fan blades 18 remaining on the still rotating rotor disk 14. The now open rotor orbit space will provide sufficient room for the fan 12 to orbit about its new center of mass.

The foregoing has described a fan case that allows the fan to orbit during a fan blade-out event and causes blade fragments to exit the fan plane in the aft direction. While specific embodiments of the present invention have been described, it will be apparent to those skilled in the art that various modifications thereto can be made without departing from the spirit and scope of the invention as defined in the appended claims.

What is claimed is:

1. A fan case for a turbofan engine having a fan including a plurality of fan blades mounted to a rotor disk and a decoupler that fails in response to a predetermined load, said fan case comprising:
   a substantially annular shell having a forward section, an intermediate section, and an aft section, said intermediate section being axially aligned with said fan and having a forward end, wherein said aft section has an inside diameter that is equal to said intermediate section inside diameter so as to define a continuous inner surface; and
   an aft facing step formed at said forward end of said intermediate section.

2. The fan case of claim 1 wherein said intermediate section has an inside diameter such that said intermediate section defines an annular space surrounding said fan blades that is sufficiently large to allow said fan to orbit when said decoupler fails.

3. The fan case of claim 2 wherein said annular space is filled with a frangible material that defines a flowpath boundary.

4. The fan case of claim 3 wherein said frangible material includes a layer of a honeycombed material covered with a layer of an abradeable material.

5. The fan case of claim 3 wherein said aft facing step defines a cylindrical surface that is coextensive with said flowpath boundary.

6. The fan case of claim 2 wherein said intermediate section has a greater wall thickness than said forward section and said aft section.

7. The fan case of claim 2 further comprising an outer shell disposed around said annular shell, said outer shell and said annular shell defining a chamber.

8. The fan case of claim 7 wherein said chamber is filled with a honeycomb structure.

9. The fan case of claim 1 further comprising an acoustic panel attached to said forward section.

10. The fan case of claim 1 further comprising an acoustic panel attached to said aft section.

11. A fan case for a turbofan engine having a fan including a plurality of fan blades mounted to a rotor disk and a decoupler that fails in response to a predetermined load, said fan case comprising:
    a substantially annular shell having a forward section, an intermediate section axially aligned with said fan and having a forward end, and an aft section, wherein said intermediate section has an inside diameter such that said intermediate section defines an annular space surrounding said fan blades that is sufficiently large to allow said fan to orbit when said decoupler fails and said aft section has an inside diameter that is equal to said intermediate section inside diameter so as to define a continuous inner surface; and
    an aft facing step formed at said forward end of said intermediate section, said aft facing step defining a cylindrical surface that has a diameter which is less than said intermediate section inside diameter.

12. The fan case of claim 11 wherein said annular space is filled with a frangible material.

13. The fan case of claim 12 wherein said frangible material includes a layer of a honeycombed material covered with a layer of an abradeable material.

14. The fan case of claim 12 further comprising a first acoustic panel attached to said forward section and a second acoustic panel attached to said aft section.

15. The fan case of claim 14 wherein said cylindrical surface, said frangible material, and said first and second acoustic panels all define a flowpath boundary.

16. The fan case of claim 11 wherein said intermediate section has a greater wall thickness than said forward section and said aft section.

17. The fan case of claim 11 further comprising an outer shell disposed around said annular shell, said outer shell and said annular shell defining a chamber.

18. The fan case of claim 17 wherein said chamber is filled with a honeycomb structure.

* * * * *